No. 861,695. PATENTED JULY 30, 1907.
A. E. AYER.
CHECK PROTECTOR.
APPLICATION FILED FEB. 8, 1907.
2 SHEETS—SHEET 1.
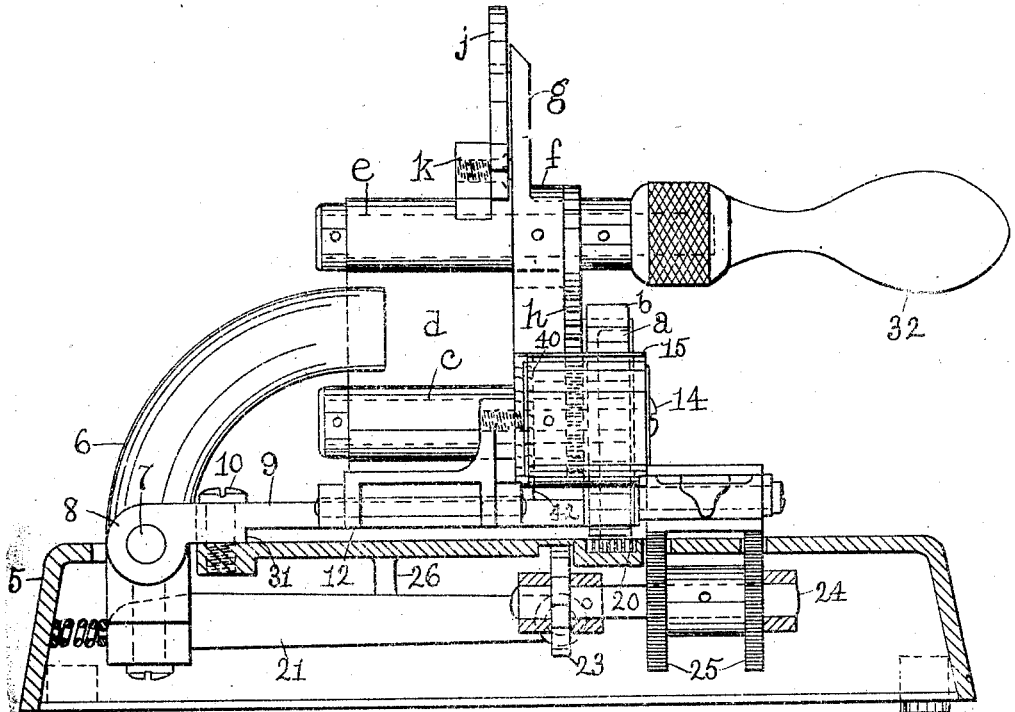
Fig. 1.
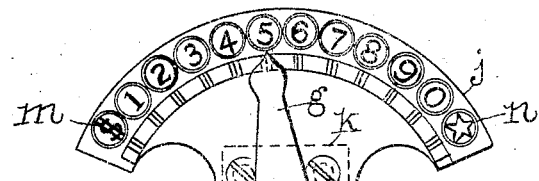
Fig. 2.
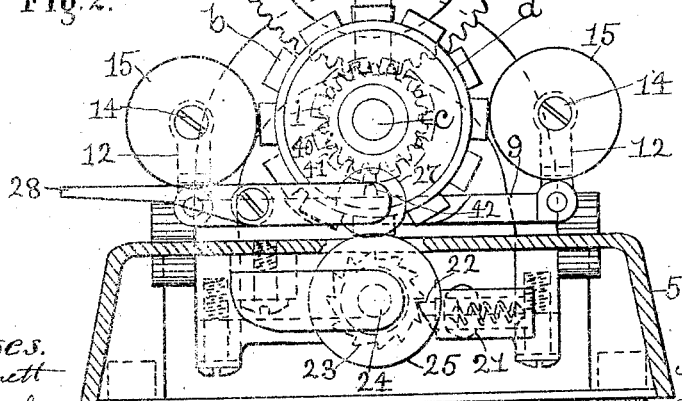
Witnesses.
C. H. Garnett
J. Murphy
Inventor.
Albert E. Ayer
by Jas. H. Churchill
atty.

No. 861,695.　　　　　　　　　　　　　　PATENTED JULY 30, 1907.
A. E. AYER.
CHECK PROTECTOR.
APPLICATION FILED FEB. 8, 1907.

2 SHEETS—SHEET 2.

Witnesses.　　　　　　　　　　　　　　Inventor.

UNITED STATES PATENT OFFICE.

ALBERT E. AYER, OF CHELSEA, MASSACHUSETTS.

CHECK-PROTECTOR.

No. 861,695.     Specification of Letters Patent.     Patented July 30, 1907.

Application filed February 8, 1907. Serial No. 356,353.

*To all whom it may concern:*

Be it known that I, ALBERT E. AYER, a citizen of the United States, residing in Chelsea, in the county of Suffolk and State of Massachusetts, have invented an Improvement in Check-Protectors, of which the following description, in connection with the accompanying drawings, is a specification, like letters on the drawings representing like parts.

This invention relates to apparatus of the class employed for marking checks with numbers indicative of the amount for which the check is drawn.

The present invention has for its object to provide a simple and efficient apparatus with which the numbers representing the amount of the check may be marked thereon in the least possible time. For this purpose, a rotatable cylinder or wheel having on its periphery marking devices representing numbers from zero to nine and preferably also the dollar sign and a star or period, is operatively connected as will be described, with a reciprocating index or pointer, which coöperates with a scale having thereon the same numbers and marks as the rotatable cylinder or wheel. The reciprocating pointer is fast on a shaft, provided with a handle by which the pointer may be turned and by means of which the marking of the check may be effected, as will be described.

Figure 3:
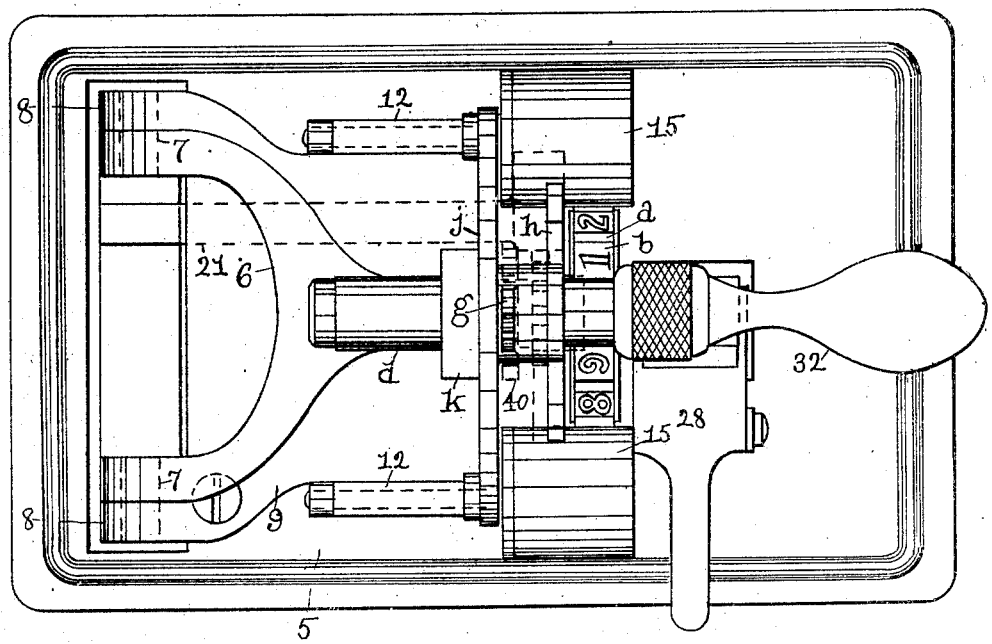
Figure 4:
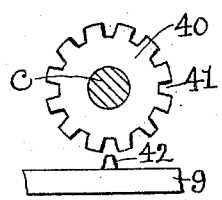

Figure 1 is a partial section and side elevation of an apparatus embodying this invention. Fig. 2 a front elevation and section of the apparatus shown in Fig. 1. Fig. 3 a plan, and Fig. 4, a detail of means for preventing accidental rotation of the marking wheel to be referred to.

Referring to the drawings, *a* represents a rotatable cylinder or wheel provided on its periphery with devices *b*, indicative of the numbers from zero to nine and preferably also the dollar sign and a star. The cylinder *a* is fast on a shaft *c* having bearings in a movable frame *d*, which also supports a shaft *e* having fast thereon a hub *f*, from which projects in one direction a pointer *g* and in the opposite direction a segmental gear *h*, which meshes with a pinion *i* fast on the cylinder shaft *c*. The segmental gear *h* and the pinion *i* are made with relation to each other, so that the movement of the pointer or index in either direction from one end of a scale *j* to the other, will cause the number cylinder or wheel *a* to make substantially one revolution. The scale *j* is made in the arc of a circle as herein shown, and is secured to a projection *k* on the movable support or frame *d*. The scale *j* is provided with numbers running from zero to nine, and also with the dollar sign *m* and with a star or period *n*.

As herein shown the sign *m* is located at the extreme left hand of the scale and the star *n* at the extreme right hand end, with the numbers between the same, the zero being located next to the star.

The movable frame *d* may be supported from a suitable base 5 and as herein shown said frame has attached to it a yoke 6, which is pivotally secured thereto, it being represented as pivoted at 7 in lugs or ears 8 extended from a platform 9 raised above the base 5 but secured thereto as by the screw 10. The platform 9 has secured to its opposite sides, uprights 12, into which are screwed the threaded end of shafts 14 upon which are loosely mounted ink-wells or rollers 15, which coöperate with the type or marking devices *b* and which are engaged with the latter by suitable spring pressure.

The number wheel *a* may have coöperating with it a platen or bed 20, which may be serrated so as to cut or perforate the check in the usual manner. Provision is also made for feeding the check after each number is marked thereon, and this may be accomplished on the upward movement of the movable support for the number cylinder or wheel. To this end, the yoke 6 has attached to it an arm 21 carrying at its end a spring-pressed pawl 22, which engages a ratchet-wheel 23 on the shaft 24 of two feed wheels 25. On the upward movement of the arm 21, the pawl rotates the ratchet and turns the feed wheels the proper amount to feed the check the proper distance after each number is marked thereon. The upward movement of the arm 21 may be limited by a suitable stop 26. The feed wheels 25 have coöperating with them a pressure-roller 27, which is designed to engage the upper surface of the check, and which is mounted, as shown, in a finger lever 28 pivoted to the platform 9. In operation, the finger lever 28 is depressed to elevate the pressure-roller 27 and permit the check to be inserted between the marking wheel *a* and the platen or bed 26, until it strikes the shoulder or stop 31 on the platform 9. The operator then turns the handle 32 fast on the shaft *e* until the pointer *g* registers with the dollar sign *m* on the scale, after which the handle is depressed to bring the type or device *b*, which is provided with the dollar sign, into contact with the check on the bed or platen and thereby mark the check with the dollar sign as the starting point. The handle 32 is then lifted, which turns the supporting frame on its pivots 7 and thereby causes the pawl 22 to rotate the ratchet wheel and also the feed wheels a sufficient distance to feed the check so as to bring an unmarked portion over the bed 20. The handle 32 is then turned to cause the pointer to register with the first number of the amount for which the check is drawn, which may be supposed to be the number 5.

In order to carry the pointer from in line with the dollar sign *m* to the number 5 on the scale, the pointer shaft *e* is required to be turned very little and can be so turned in a minimum time. This movement of the pointer shaft is communicated to the wheel shaft c by the segmental gear h and pinion i and rotates the wheel the proper amount to bring the type or marking device for the number 5 into operative position over the bed 20, after which the handle is depressed to effect the marking of the number 5 on the check.

The operation described with relation to the number 5 is repeated for each number of the sum for which the check is drawn and preferably also for the period or star n. On the upward and downward movement of the number wheel, the type or marking devices thereon may be inked by contact with the ink rollers, but these latter may be omitted in some cases.

In order to prevent movement of the marking device b while the impression is being made on the check, I prefer to secure to the shaft c a disk or wheel 40 (see Fig. 4) having the same number of slots 41 as there are type on the type-wheel, which slots coöperate with a projection 42 on the platform 9 arranged in central line with and behind the operative number or type on the type-wheel so that when a marking device b is engaged with the check, imperfections in the marking, caused by rotary movement of the number wheel are avoided, as the said wheel is restrained from such movement by the projection 42 entering one of the slots 41.

It will be observed, that the operator can quickly and easily position the marking devices or type on the rotatable cylinder or wheel a, in the least possible time, as it is only necessary for him to turn the pointer shaft less than a half revolution in order to register the pointer with all the numbers or marks on the scale. Furthermore, the numbers on the scale may be made substantially large, as is also the pointer, which also serves to expedite the marking of the checks.

I have herein shown one embodiment of this invention, which consists essentially of the reciprocating pointer coöperating with a scale and gearing to effect a substantially complete rotation of a cylinder for each complete movement of the pointer in either direction, but I do not desire to limit the invention to an apparatus having the specific additional features above described. So also I have herein described the apparatus as especially adapted for marking checks, but I do not desire to limit myself in this respect, as the apparatus with suitable modifications of the marking device may be employed for marking stock certificates or other like paper or pamphlets.

I may prefer to reciprocate the pointer in the arc of a circle, but I do not desire to limit my invention in this aspect. So also I do not desire to limit myself to any particular style or kind of type or marking devices on the wheel a.

Claims.

1. In an apparatus of the class described, in combination, a rotatable wheel or member provided on its periphery with marking devices, a scale having indications corresponding to said marking devices, a pointer or index coöperating with said scale, a shaft on which said pointer is mounted, a segmental gear on said shaft, a pinion in mesh with said gear and connected with said wheel, a movable support for said parts, and a handle on said shaft to rotate the latter and to effect bodily movement of said rotatable wheel, substantially as described.

2. In an apparatus of the class described, in combination, a movable frame, a substantially vertical scale erected upon said frame, a shaft journaled in said frame and having fast thereon a pointer coöperating with said scale, a rotatable wheel or member provided on its periphery with marking devices, a shaft journaled in said frame and on which said wheel is mounted, a pinion on the shaft of said wheel, a segmental gear on said pointer shaft in mesh with said pinion, and a handle on said pointer shaft to move said pointer over said scale in one plane and to effect movement of the said frame and the parts carried thereby in a plane substantially at right angles to the plane of movement of the pointer.

3. In an apparatus of the class described, in combination, a base, a frame pivoted thereto to move in a substantially vertical plane, a substantially vertical scale erected upon said pivoted frame, a substantially horizontal shaft journaled in said frame, and having a pointer fast thereon and coöperating with said scale, a rotatable wheel or member provided on its periphery with marking devices, a shaft supported by said frame and on which said wheel is mounted, gearing connecting said pointer shaft with the shaft of said rotatable wheel, and a handle on said pointer shaft to turn the same and move the pointer in a vertical plane and to turn said frame on its pivot to effect bodily movement of said rotatable wheel, substantially as described.

In testimony whereof, I have signed my name to this specification in the presence of two subscribing witnesses.

ALBERT F. AYER.

Witnesses:
JAS. H. CHURCHILL,
J. MURPHY.